United States Patent
Rabuté

(10) Patent No.: US 9,163,725 B2
(45) Date of Patent: Oct. 20, 2015

(54) OIL CONTROL RING WITH FERROUS BODY LESS THAN 2.0 MILLIMETERS HIGH FOR INTERNAL COMBUSTION ENGINES

(75) Inventor: Rémi Daniel Rabuté, Eaubonne (FR)

(73) Assignee: MAHLE Metal Leve S/A, Jundiai, SP (BR)

( * ) Notice: Subject to any disclaimer, the term of this patent is extended or adjusted under 35 U.S.C. 154(b) by 385 days.

(21) Appl. No.: 13/318,262

(22) PCT Filed: Apr. 30, 2010

(86) PCT No.: PCT/BR2010/000139
§ 371 (c)(1),
(2), (4) Date: Jan. 20, 2012

(87) PCT Pub. No.: WO2010/124353
PCT Pub. Date: Nov. 4, 2010

(65) Prior Publication Data
US 2012/0112418 A1 May 10, 2012

(30) Foreign Application Priority Data
Apr. 30, 2009 (BR) ...................................... 0901045

(51) Int. Cl.
*F16J 9/20* (2006.01)
*F16J 9/06* (2006.01)
*F16J 9/26* (2006.01)

(52) U.S. Cl.
CPC *F16J 9/062* (2013.01); *F16J 9/206* (2013.01); *F16J 9/26* (2013.01)

(58) Field of Classification Search
USPC .......................... 277/434–435, 444, 460, 481
See application file for complete search history.

(56) References Cited

U.S. PATENT DOCUMENTS 2,912,292 A * 11/1959 Lawitschka .................... 277/444
4,497,497 A * 2/1985 Berti et al. ..................... 277/463

(Continued)

FOREIGN PATENT DOCUMENTS

| BR | PI9202268 | 3/1993 |
| JP | 2005-291003 | 10/2005 |
| JP | 2007-170455 | 7/2007 |

(Continued)

OTHER PUBLICATIONS

International Search Report and Written Opinion mailed Sep. 2, 2010 of corresponding international application No. PCT/BR2020/000139, filed Apr. 30, 2010.

(Continued)

*Primary Examiner* — Vishal Patel
(74) *Attorney, Agent, or Firm* — Alston & Bird LLP

(57) ABSTRACT

There is described an oil control ring idealized for internal combustion engines and formed by a ferrous body less than 2.0 millimeters high, which comprises two external contact surfaces where each surface contains a first and a second end ridges, two slanted faces where each slanted face contains a third end, a peripheral cross section facing the cylinder wall and an internal circular section facing the side of the piston, where each contact surface has a height (h) between the first and the second end ridges of up to 0.15 millimeters and the angle of the slanted face is comprised between 8 and 12 degrees and also by the peripheral cross section is solid, without the presence of cracks, holes and/or other kinds of oil drainage areas. The ring permits an improved distribution of the contact pressure of the combination and, therefore, a better conformability of the ring with the cylinder wall.

5 Claims, 6 Drawing Sheets

(56) References Cited

U.S. PATENT DOCUMENTS

| | | | |
|---|---|---|---|
| 5,295,696 A * | 3/1994 | Harayama et al. | 277/443 |
| 6,454,271 B2 * | 9/2002 | Ishida | 277/434 |
| 6,834,861 B2 * | 12/2004 | Takizawa et al. | 277/436 |
| 7,117,594 B2 | 10/2006 | Preyer | |
| 2004/0021270 A1 | 2/2004 | Takizawa et al. | |
| 2006/0113730 A1 * | 6/2006 | Suzuki et al. | 277/434 |

FOREIGN PATENT DOCUMENTS

WO    WO/2008/151589    12/2008

OTHER PUBLICATIONS

International Preliminary Report on Patentability mailed Jul. 13, 2011 of corresponding international application No. PCT/BR2020/000139, filed Apr. 30, 2010.

* cited by examiner

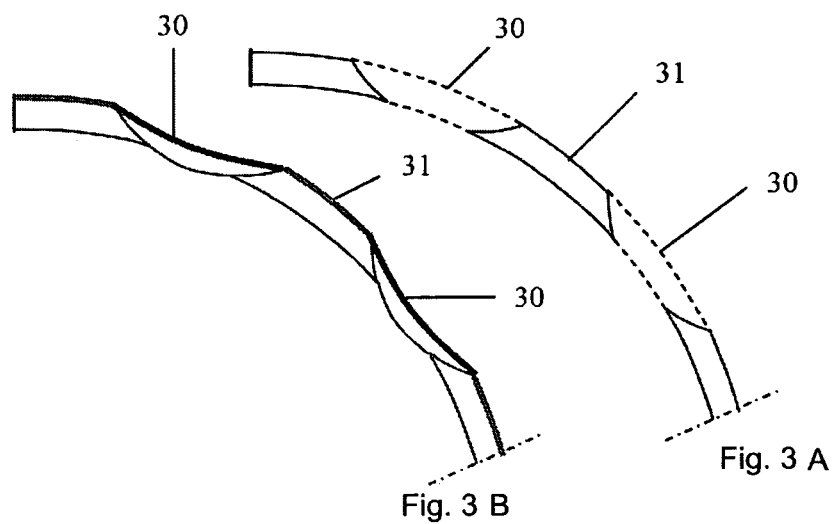
Fig. 3 A
Fig. 3 B
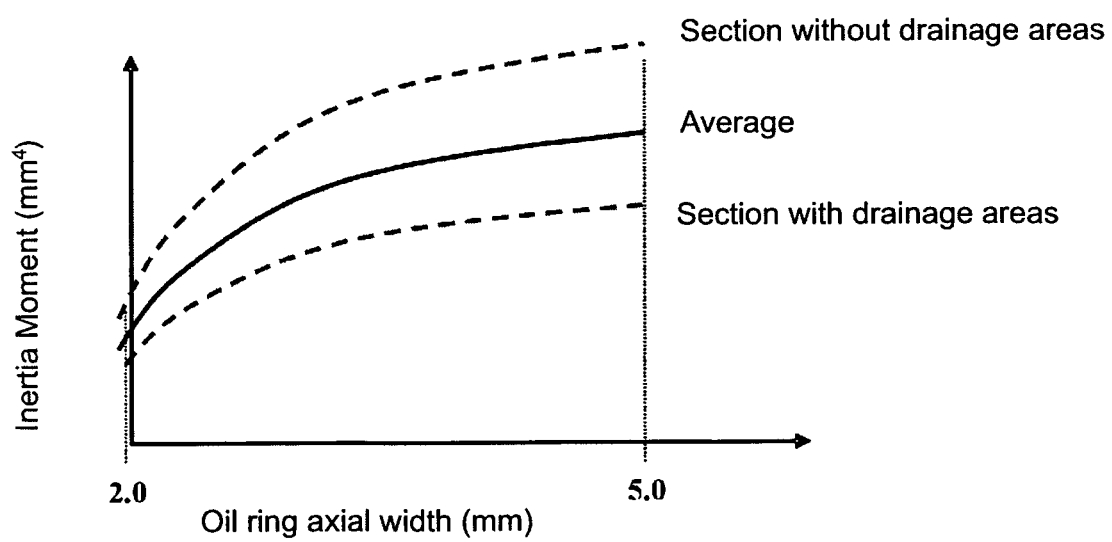
Fig. 4

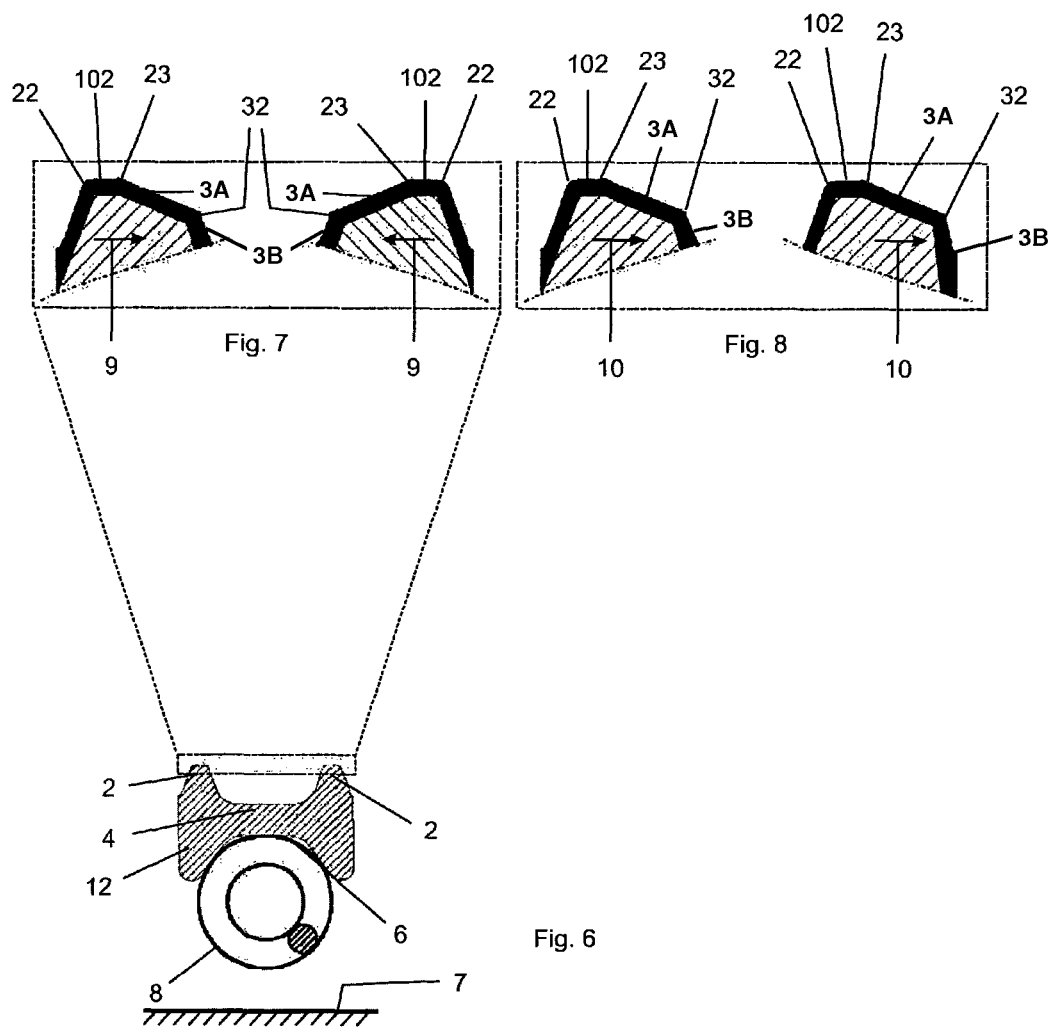

OIL CONTROL RING WITH FERROUS BODY LESS THAN 2.0 MILLIMETERS HIGH FOR INTERNAL COMBUSTION ENGINES

CROSS REFERENCE TO RELATED APPLICATIONS

This application is a national stage application, filed under 35 U.S.C. §371, of International Application No. PCT/BR2010/000139, filed Apr. 30, 2010, which claims priority to Brazilian Patent Application No. PI0901045-9, filed Apr. 30, 2009, both of which are hereby incorporated by reference in their entirety.

BACKGROUND OF THE INVENTION

1. Field of Invention

The present invention refers to an oil control ring formed by a ferrous body up to 2.0 millimeters high, idealized for internal combustion engines and which permits an improved distribution of contact pressure and consequently oil scraping, given the association of its constructive design and elastic characteristics of its material base and/or of the assistance of the elastic expansion elements, thus providing better conformability of the ring with the cylinder wall.

2. Description of Related Art

The internal combustion engines are energy transforming mechanisms used by the vast majority of automotive vehicles, and basically comprise two main parts: one or more cylinder heads and the engine block. At the base of the cylinder head(s) are located the combustion chambers (in diesel engines in general the combustion chambers are heads of the pistons) and in the block are located the cylinders and the crankshaft combination. The rotary assembly is comprised of piston(s), rod(s) and the crankshaft.

The engine converts the energy produced by the combustion of the mixture (fuel and air) in the combustion chambers into mechanical energy capable of generating movement to the wheels.

As the driving force needed to move the automobile comes from the burning of the air/fuel mixture in the combustion chamber, and in order to ensure a homogenous combustion and without burning oil and also to avoid the excess passage of gases from the cylinder to the carter, it is necessary to use rings to ensure good sealing of the gap existing between the piston and the cylinder wall.

Normally, three rings are used, of which two are compression rings and one an oil ring. The compression rings are to prevent the combustion gases from entering the carter and the oil ring is to scrape the excess oil from the cylinder wall and return it to the carter.

Another important function of the rings is to act as heat transmission bridge from the piston to the cylinder wall/casing where the heat dissipates through the cooling system.

The oil rings may be comprised by one, two or three pieces, the two latter types being most commonly used in internal combustion engines. As main characteristics, the one-piece ring uses the elastic properties inherent to the material base in order to meet the expansion force requested for the application, whereas the two-piece ring basically comprises a body and an elastic element and the three-piece ring basically comprises a support body and two ring segments to serve the same purpose.

Currently, the oil rings found in the state of the art have cracks or holes distributed along the peripheral cross section of the body. The function of these cracks or holes is to drain off the excess oil accumulated between the two outer work faces of the ring and increase its flexibility by reducing the firmness of the cross section that contains the cracks, providing greater conformability of the part/combination in relation to the cylinder wall.

However, today, spurred by the drive for greater energy efficiency, engine design trends have moved towards the manufacture of smaller engines, with the reduction of losses in power by friction. To accompany these developments, the height of oil rings have become ever reduced, as well as smaller loads and/or expansion force.

Furthermore, with the trends of reducing attrition in the working of the engine, it is possible to maintain an appropriate contact pressure on the interface ring/cylinder, reducing the ring contact area, even under the actuation of reduced expansion loads. Yet, difficulties in manufacturing, handling of parts and even a potential breakage in the work are some obstacles that must be overcome in projects that are designed to reduce the contact area of the oil control rings.

The ring defined in Brazilian patent application PI 9202268 is designed to solve the problem of reducing the contact area using pear-shaped contact surface profiles.

In contrast, the object of patent U.S. Pat. No. 7,117,594 is designed to solve the above-mentioned problem by using a stepped contact surface profile, in the form of steps.

In any case, the design changes associated to this trend of de-creasing height and load, as proposed in the state of the art, may also bring with them other undesirable effects, such as the difference in flexibility between the regions having cracks or not along the cross section of the ring thus enabling a variation of contact pressure applied to the cylinder wall that may generate an insufficient or unequal contact between the ring and the cylinder wall and even the elastic element in relation to the ring in the case of two-piece rings.

North American patent U.S. Pat. No. 6,454,271 describes a combined oil ring, without holes or cracks in the cross section, with an I-shaped body and which uses a rectangular or trapezoidal expander with lower axial height and still capable of achieving high pressure levels, using the removal of the oil drainage areas to enable the construction of the proposed design. Japanese patent application JP 2007170455 describes a two-part oil ring that has reduced spacing of the peripheral cross section (0.6 millimeters or less), where the elimination of the oil drainage areas permits greater constructive firmness of the ring.

Document US2004/021270 refers to a two piece oil control ring comprising a ring body formed into a generally "M" or "I" shaped section with an annular groove on an inside surface of the ring body and a coiled expander attached in the annular groove of the ring body for resiliently urging the ring body toward an inner wall of a cylinder.

The ring body is made of stainless steel that contains chromium of 3.0 to 13.0 weight % with the outer and inner circumferential surfaces covered with nitrided layers. Circular ratio of an outer edge length to an inner edge length in the cross section of the ring body is in a range between 1.08 and 1.32 to keep precise peripheral circularity of the ring body so that the nitrided layers survive lapping of the ring body.

Such patent application, however, does not reveal some important characteristics of the present oil control ring, like at least one contact surface flat, substantially parallel to the cylinder wall and formed by a removal of approximately 25 μm of a triangular end, or the slanted faces of upper and lower rails positioned facing each other.

Document JP 2005 291003 refers to a an odd-form wire rod with a groove with a width of 2 millimeters or less and with a thickness of 2 millimeters or less which can mold an oil ring suitable for a small-sized internal combustion engine. The odd-form wire rod with the groove is characterized in that the width of the rail part sliding surface is not reduced because of grinding processing which makes the surface that is in contact with a ring groove of the piston parallel. The clearance between the extended base lines of the surfaces on both sides which become the surfaces that come into contact with the ring groove of the piston and the outer corner part of the rail part is made not less than 0.08 millimeters each.

This patent application also does not reveal some important characteristics of the present oil control ring, like at least one contact surface flat, substantially parallel to the cylinder wall and formed by a removal of approximately 25 µm of a triangular end, or the slanted faces of upper and lower rails positioned facing each other.

Hence, it is noted that there has not yet been developed an oil control ring that has a maximum thickness of up to 2.0 millimeters and with the peripheral cross section solid, that is, that has no holes or cracks for the oil flow, in order to solve the difficulties of conformation of the ring surfaces in relation to the cylinder wall and/or of the ring in relation to the elastic element if such is used, also being capable of maintaining suitable levels of contact pressure, even under low load due to the use of a profile that provides reduced contact of the ring with the cylinder interface.

BRIEF SUMMARY

The objective of the present invention is to provide an oil control ring formed by a ferrous body for heights less than 2.0 millimeters and by an elastic element for internal combustion engines, where the peripheral cross section of the body is solid, that is, it has no cracks or holes on its surface.

The objective of the present invention is also to provide an oil control ring which, due to the use of peripheral work face with reduced contact surface and the absence of holes and cracks in its body, permits a better distribution of pressure, guaranteeing a suitable thickness of the oil film between the ring and the cylinder wall, enabling a reduction in pressure of the ring design and, therefore, the consequent power losses in the system due to friction.

A further objective of the present invention is to provide an oil control ring where the use of a peripheral work face profile with reduced contact surface, associated to the use of higher tapered angle of the contact face against the inner wall of the cylinder, is designed to minimize the radial wear which increases the axial width of the contact face, thus maintaining the design pressure and, consequently, of the oil film control between the ring and the cylinder wall during the useful life of the engine.

Additionally, the present invention offers the possibility of reducing costs by providing an oil control ring which, without the presence of cracks or holes in the body of the ring, can go without the process steps related to the machining of the ring outflow areas.

The objectives of the present invention are achieved by an oil control ring, formed by a ferrous body less than 2.0 millimeters high for internal combustion engines, comprising:
two external contact surfaces, each containing a first and a second end ridges;
two slanted faces each containing a third end ridge;
a peripheral cross section facing the cylinder wall; and
an internal section facing the side of the piston,
each contact surface having a height between the first and the second end ridge comprised up to a maximum of 0.15 millimeters; the angle of each slanted face being comprised between 8 and 12 degrees and also by the peripheral cross section being solid, that is, having holes and cracks.

Further, the objectives of the present invention are achieved by an oil control ring for internal combustion engines, formed by a ferrous body less than 2.0 millimeters high, which comprises two external contact surfaces and the like each having a profile comprised by a parallel part of at most 0.15 mm associated to a secondary face slanted between 8 and 12 degrees, and which also contains a circular section facing the piston channel and side-placing faces, making the peripheral cross section solid, without cracks, holes or any other type of oil drainage region.

The characteristics mentioned above, as well as other aspects of the present invention, will be better understood by way of the examples and the detailed description of the drawings that follow.

BRIEF DESCRIPTION OF THE FIGURES

The present invention will now be described in greater detail based on an example of execution represented in the drawings. The drawings show:

FIG. 3A—is an illustration of the regions of the ring that make contact with the piston during the ring production phase.

FIG. 3B—is an illustration of the regions of the ring that do not contact the piston due to the oil drainage crack regions when the engine is running and/or during ring processing operations.

FIG. 4—is a comparative graph of the change in the point of inertia of a cross section of an oil ring by the use or not of cracks and/or oil drainage areas.

FIG. 6—is a schematic view of the cross section of the oil ring for internal combustion engines that is the object of the present invention.

FIG. 7—is a detailed view of the profiles of the contact surface of the oil ring for internal combustion engines that is the object of the present invention.

FIG. 8—is a detailed view of the profiles of a second embodiment of the contact surface of the oil ring for internal combustion engines that are the object of the present invention.

DETAILED DESCRIPTION OF VARIOUS EMBODIMENTS

Figure 1:
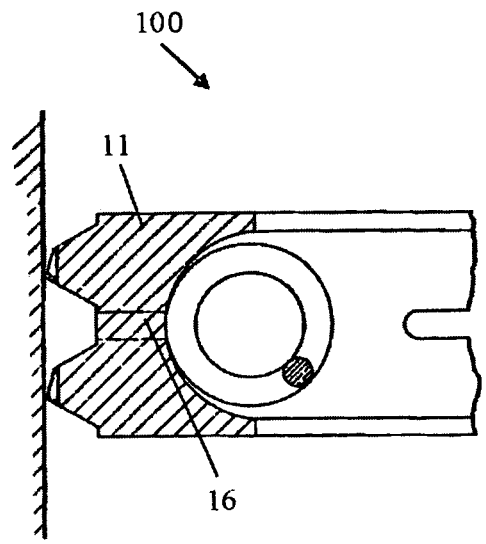
FIG. 1—is a cross sectional view of an oil ring for internal combustion engines of the state of the art.

The Brazilian patent application PI 9202268 defines an oil control ring 100 which provides efficient oil scraping by means of a pear-shaped contact surface 11. As illustrated in FIG. 1, it also has oblong slits 16 for the oil to return to the carter of the engine.

However, with the decrease in width and in the tangential load of the oil control rings over recent years, associated to the technological advances of internal combustion engines and its components, the quantity of lubricating oil scraped by the rings is significantly reduced. The outflow areas can now serve as a way for the lubricating oil, which goes from the piston channel to the cylinder wall and not vice-versa as originally designed.

Additionally, with the reduction of the cross section of the ring, the advantages achieved by the variation of the momentum of inertia generated by the influence of the outflow areas (cracks or holes), are greatly minimized, as can be clearly seen in FIG. 4.

Worse than this, for the future, with the ever lower values in height and in tangential load applied in low friction rings, the presence of cracks or holes 30 may cause an excessive reduction in the structural firmness of the ring, leading to local deformations along the periphery, generating regions "without contact" when the ring is working in the engine, as can be seen in FIG. 3B, which is extremely undesirable.

The efforts to provide a better distribution of the oil outflow areas, increasing its frequency and reducing its sizes, by the use of advanced manufacturing techniques, for example Laser, still do not perform or operate suitably, not to mention the high production costs of these rings.

With a view to increasing the uniformity of ring contact with the cylinder wall along its entire length, some developments have been introduced in manufacturing, such as, for example, the lapping of the contact face of the ring at the end of the production process, in order to guarantee contact of the ring in its entire periphery against the cylinder wall. However, even with good results after this operation, unequal contact may occur during the operation, since the cylinder presents circular deformation, whereas the ring lapping is carried out inside an almost perfect cylinder and in some cases with a greater load than that of working.

FIG. 3B exemplifies the problem of the lack of ring contact with an abrasive surface, due to the outflow regions of the ring or notches, in a lapping process. During this process, even if the ring is sliding over an abrasive circular surface in order to distribute the contact, the areas of cracks 30 do not touch the abrasive surface such as the bridge areas 31 shown, due to the non-homogeneity of the cross section resulting from the presence of cracks in the ring body and the potential variability resulting from the manufacturing processes thereof.

Even with the correct adjustment of the parameters of the lapping operation (load, abrasive, casing, time), the areas of the cracks 30 are artificially "pushed" towards the abrasive surface (the contact line formed can visually demonstrate the contact as exemplified in FIG. 3A), however, once the force is removed, the surfaces of the regions having cracks return to their initial form and, as a result, the harmful and undesirable event of lack of contact in the region of the cracks may occur when the engine is running (exactly as illustrated in FIG. 3B). As previously mentioned, when running, the engine cylinder deforms from its circular form and the variable conformability of the ring, makes it more problematic to obtain contact, and hence sealing along the entire perimeter of the part.

In order to increase the firmness of the product in terms of sealing, a solution of the present invention is the possibility of a greater radial removal 21 during the lapping operation without a significant increase in the contact range, given the greater tapered angle of the profile. When running, the flat part 102 guarantees a suitable contact range and minimizes the risk of flakes which might occur if the vertex were maintained 21.

Improvement in the operations of grinding and burnishing of the cylinders, associated to the low load rings, can lead to an increase in operating time of the engine for the "wearing-in" of the parts. The "wearing-in" period is needed because, notwithstanding all the care taken to produce coinciding parts, the inherent variability of production and the engine operation deformations require that some wear occurs before the part's sliding surfaces match. The consumption of lubricating oil of a new engine is greater until a suitable adjustment is achieved.

Figure 5B:
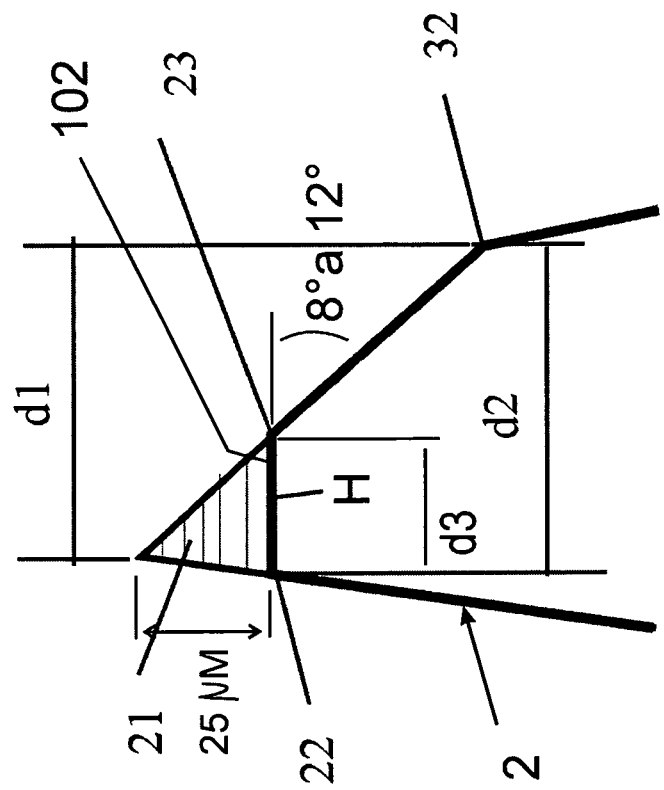
FIG. 5B—is a detailed view of the profile of the contact surface of the oil ring for internal combustion engines that is the object of the present invention.
Figure 5A:
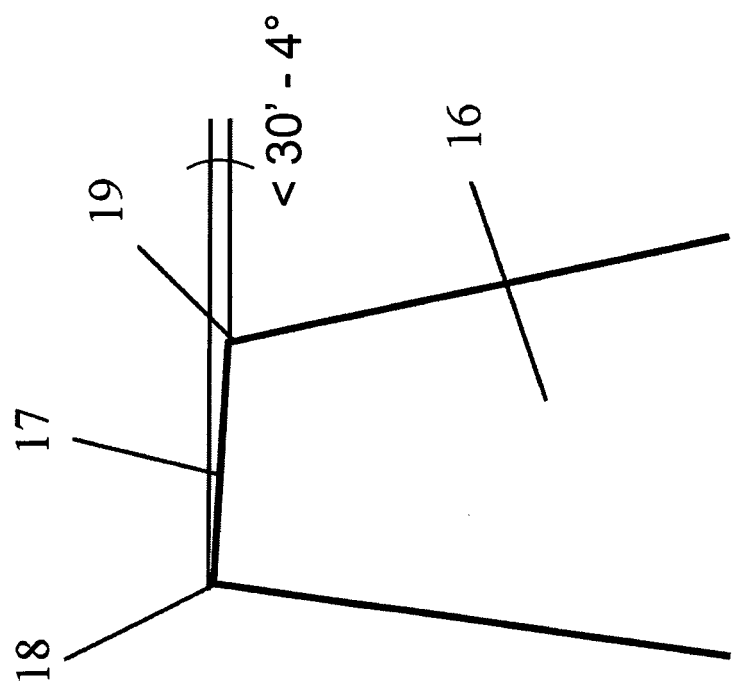
FIG. 5A—is a detailed view of the profile of the contact surface of the oil ring of the state of the art.
Figure 9:
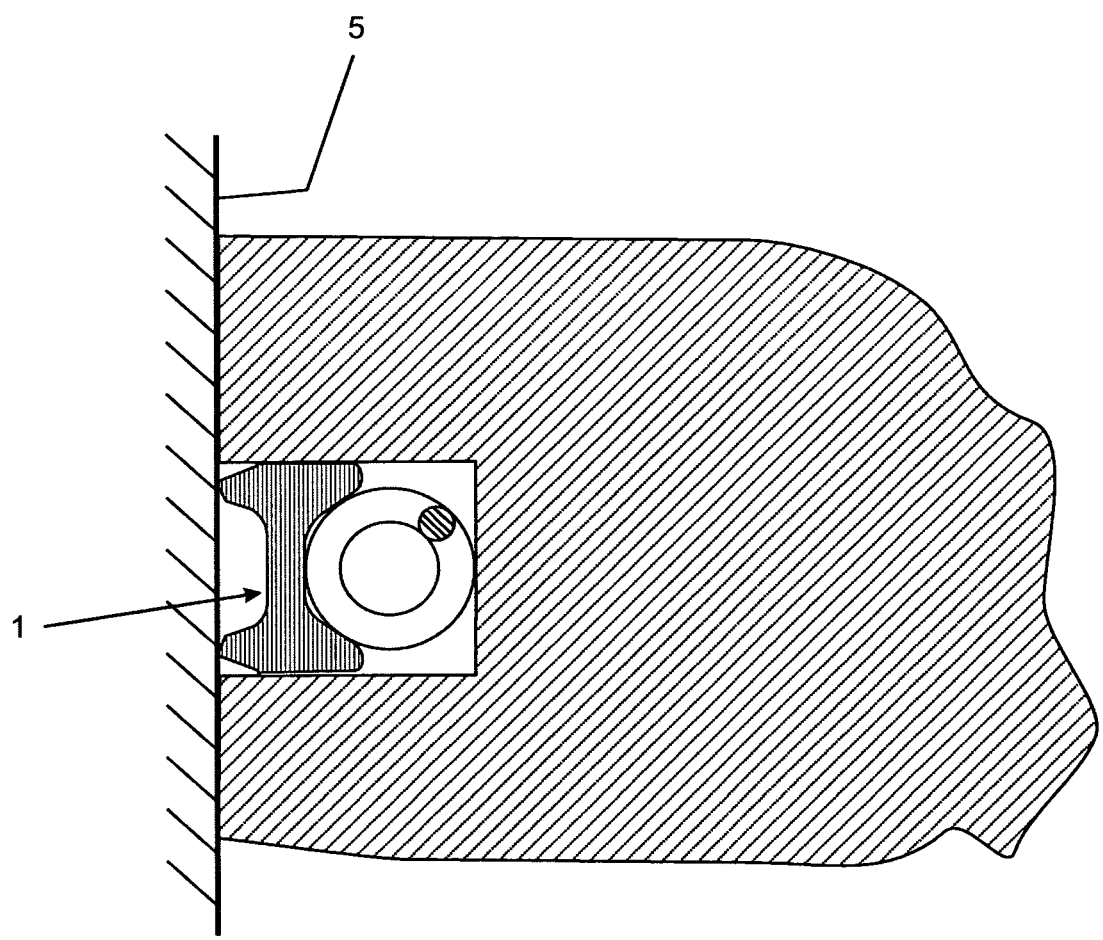
FIG. 9—is a schematic cross-section view of a piston equipped with a ring inside the cylinder of an internal combustion engine.

As can be seen in FIG. 5A, the state of the art presents a solution for oil rings, in which the profile of the contact surface 16 has a slanted face 17 (between 30' and 4°)☐☐ where said arrangement only permits a punctual contact in the ridge 18 with the cylinder wall, and may cause it to break and consequently cause damages to the cylinder wall besides being more susceptible to the increase of the contact region due to the radial wear.

According to a preferred embodiment and as can be seen in FIG. 5B, the oil control ring 1 that is the object of the present invention is formed by a ferrous body 12, such as cast iron or any kind of steel, less than 2.0 millimeters high and by a resilient/elastic element 8, such as a helicoidal spring, flat spring or other expanding means, or even by using the very mechanical characteristics of its material base to provide the expansion force needed for this type of application.

The ring 1 also has on its body 12, two external contact surfaces 2 each containing a triangular region 21 (which will subsequently be removed in a final lapping process), a parallel contact face 102, a slanted face 3A, a slanted face 3B, a peripheral cross section 4 facing the cylinder wall 5 and a circular section 6 facing the side of the piston 7. The surfaces 2 project towards the cylinder wall when the assembly is mounted.

As can be seen in FIG. 5B, each contact surface 2 of the oil control ring 1 initially presents a distance having a maximum specification of 0.15 mm formed from the ridge 22 to the ridge of 23, where the slanted face 3A begins. The angle of the slanted face 3A should be between 8 and 12 degrees, preferably 10 degrees in relation to the axial length of the ring.

During the ring manufacture, the triangular end 21 is removed so that the ring achieves its end format, by lapping the contact face or other similar process. Alternatively, a tape made of steel or other material can be used with the desired profile.

The finishing or removal process consists of the removal of approximately 25 μm (micro-meters) of the triangular end 21 of the contact surface 2, defining the contact surface 102 in flat form, parallel to the cylinder wall which may vary from 0.10 to 0.15 millimeters.

FIG. 6 illustrates the cross section of the oil ring 1 of the present invention, whose peripheral portion 4 presents no cracks or holes outflow (it is solid or constant), providing the ring a conformability to the more homogeneous and efficient cylinder, if compared to that is described in the state of the art.

The peripheral cross section 4 constant or solid provides improved contact between the ring and the cylinder and/or between the ring and the elastic element, in the case of a two-piece type ring, by eliminating the excessive flexibility and not uniform caused by the cracks in the ring. As a consequence of this improved contact, the failures related to the non-uniform contact of the work face and with potential inlay of the spring, due to natural wear during operation, in the ring channel in the case of two-piece type ring 2, are extremely reduced. Additionally, eliminating the cracks or the holes, the present invention is cheaper to produce, eliminating the need for manufacturing and finishing operations of the outflow areas (cracks or holes).

FIG. 7 illustrates the detail of the contact surfaces 102 of the ring 1 of the present invention. The contact surfaces 102 are positioned such that the two first regions of the slanted faces 3A, 3B are facing each other, that is, asymmetrically, pursuant to the direction indication 9, in an assembly that mainly focuses on the reduction of attrition of the contact surfaces in relation to the cylinder wall.

FIG. 8 illustrates another embodiment for the contact surfaces 102, where the contact surfaces 102 are positioned such that the two slanted faces 3A, 3B are facing the same direction, that is, symmetrically, pursuant to the direction indication 10. Besides enabling a reduction in attrition when the part is working, this assembly provides improved oil scraping by the ring in the cylinder wall, implying lower consumption of lubricant.

Figure 2:
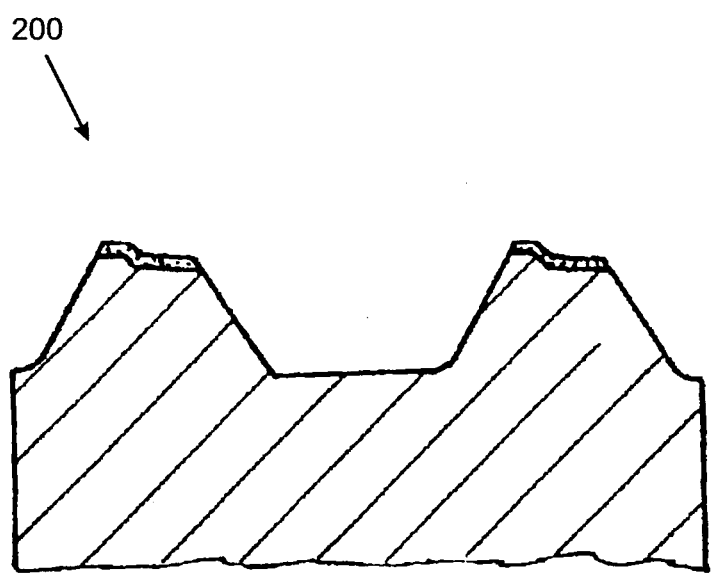
FIG. 2—is a view of the stepped work face profile of an oil ring for internal combustion engines of the state of the art.

The use of the contact surface profiles as described in FIGS. 7 and 8, jointly with the elimination of the oil drainage areas (cracks or holes), FIG. 6, presents a better solution in relation to the oil control, avoiding a problem found in the rings of the state of the art FIG. 2, where the stepped profile of the contact face 200 acts as an oil accumulator, retaining the fluid and causing the oil to accumulate in the upper part of the oil ring. Through the solution proposed, the lubricating oil does not accumulate (or accumulates less) in the upper part and is much better redistributed along its actuation field.

Figure 10:
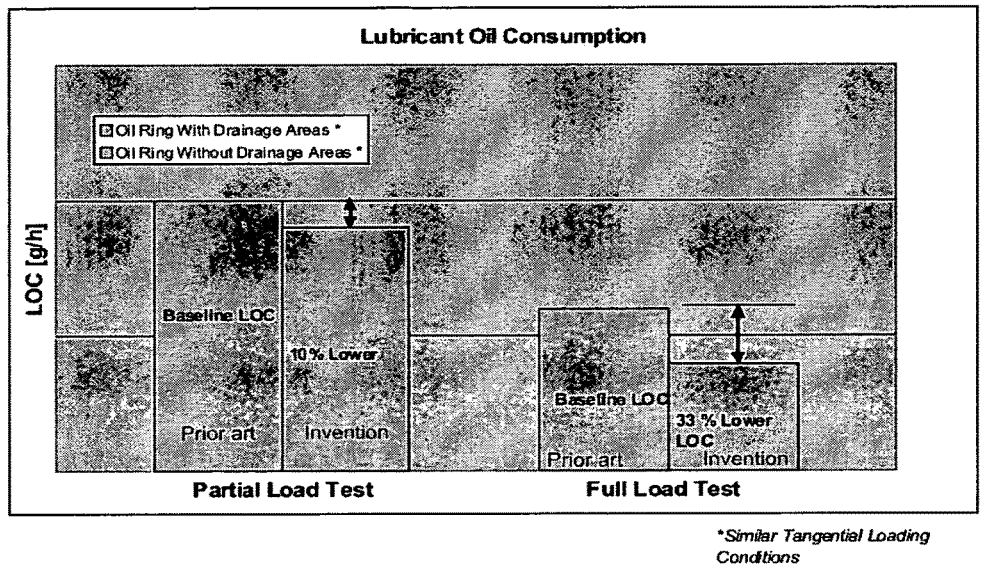
FIG. 10—is a comparative graph of the consumption of lubricating oil of an engine equipped with an oil ring of the state of the art and an engine equipped with the oil ring that is the object of the present invention.

In the graph illustrated in FIG. 10, it is possible to see the significant reduction in the consumption of lubricating oil made viable by the oil ring that is the object of the present invention. For a same tangential force applied and under partial loads, the engine equipped with the ring of the present invention, without holes or cracks for the passage/drainage of oil presented a consumption of lubricating oil about 10% less than the same engine equipped with conventional rings, having said cracks. If the same engine is operated under total load, the reduction in oil consumption is even more significant, reaching no less than 33%.

Figure 11:
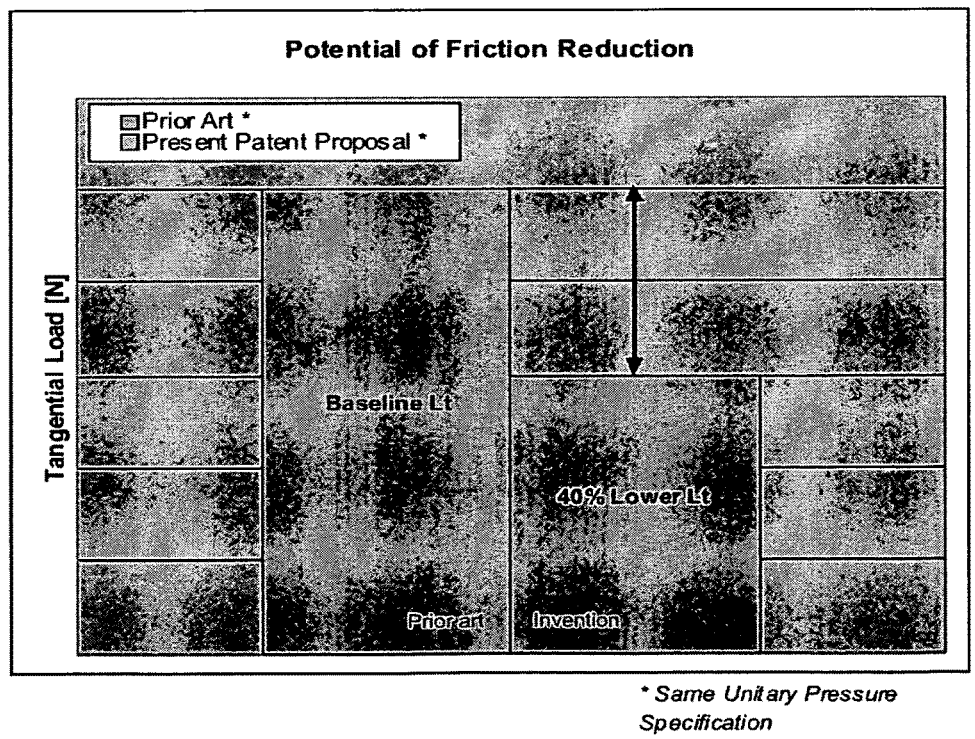
FIG. 11—is a comparative graph of the reduction of wear by attrition of an oil ring of the state of the art and of the oil ring that is the object of the present invention.

The graph illustrated in FIG. 11, in turn, reveals a reduction of 40% in the wear by attrition of an oil ring of the state of the art and the oil ring that is the object of the present invention, due to the variation of the tangential force, which provides considerably greater durability under the same operating conditions.

Having described two examples of preferred embodiments, it should be understood that the scope of the present invention encompasses other possible variations, such as, for example, the use of surface treatments and ceramic and metallic coatings, with the aim of improving the characteristics of resistance to wear, corrosion and decrease of the attrition forces, being limited only by the content of the claims appended hereto, potential equivalents being included therein.

The invention claimed is:

1. Oil control ring (1) for internal combustion engines, formed by a ferrous body (12) having a height of less than 2.0 millimeters, the oil control ring comprising:
   a peripheral cross section (4) facing the cylinder wall (5);
   two external contact surfaces (102), each having a first end and a second end, each of the first ends defining in part a first (22) end ridge and each of the second ends defining in part a second (23) end ridge;
   two slanted faces (3A), each having a first end and a second end, each of the first ends defining in part the second (23) end ridge, and each of the second ends defining in part a third end ridge (32);
   two slanted faces (3B), each having a first end and a second end, each of the first ends defining in part the third end ridge (32), each of the second ends being substantially adjacent the peripheral cross section (4); and
   an internal section (6) facing the side of the piston (7), wherein:
      the two external contact surfaces (102) are flat, substantially parallel to the cylinder wall, and have a height (h) between the first and the second end ridges (22, 23) comprised up to a maximum of 0.15 millimeters;
      (ii) the angle of each of the two slanted faces (3A) relative to each of the two external contact surfaces (102) is between 8 and 12 degrees;
      (iii) each of the two slanted faces (3B) are oriented at an angle relative to both the two external contact surfaces (102) and the two slanted faces (3A);
      (iv) the peripheral cross section (4) is absent of holes and cracks;
      (v) the two slanted faces (3A) and the two slanted faces (3B) are all positioned facing relatively toward each other;
      (vi) the first (22) end ridges, the second (23) end ridges, and the third (32) end ridges are all oriented so as to define respective peaks extending in a first direction outwardly relative to the peripheral cross section (4); and
      (vii) the first (22) end ridges, the second (23) end ridges, and the third (32) end ridges all, due to their orientation in the first direction, are configured to operatively engage the cylinder wall through a suitable thickness of an oil film between ridges (22, 23, 32) of the oil control ring and the cylinder wall.

2. Ring (1) according to claim 1, wherein the angle of each of the two slanted faces (3A) is 10 degrees.

3. Ring (1) according to claim 1 further comprising an elastic element (8) as an expansion force generating vehicle.

4. Oil control ring (1) for internal combustion engines, formed by a ferrous body (12) having a height of less than 2.0 millimeters, the oil control ring comprising:
   a peripheral cross section (4) facing the cylinder wall (5);
   two external contact surfaces (102), each having a first end and a second end, each of the first ends defining in part a first (22) end ridge and each of the second ends defining in part a second (23) end ridge;
   two slanted faces (3A), each having a first end and a second end, each of the first ends defining in part the second (23) end ridge, and each of the second ends defining in part a third end ridge (32);
   two slanted faces (3B), each having a first end and a second end, each of the first ends defining in part the third end ridge (32), each of the second ends being substantially adjacent the peripheral cross section (4); and
   an internal section (6) facing the side of the piston (7), wherein:
      the two external contact surfaces (102) are flat, substantially parallel to the cylinder wall, formed by a removal of approximately 25 μm of a triangular end (21), and have a height (h) between the first and the second end ridges (22, 23) comprised up to a maximum of 0.15 millimeters;
      (ii) the angle of each of the two slanted faces (3A) relative to each of the two external contact surfaces (102) is between 8 and 12 degrees;

(iii) each of the two slanted faces (3B) are oriented at an angle relative to both the two external contact surfaces (102) and the two slanted faces (3A);
(iv) the peripheral cross section (4) is absent of holes and cracks;
(v) the two slanted faces (3A) and the two slanted faces (3B) are all positioned facing relatively toward each other;
(vi) the first (22) end ridges, the second (23) end ridges, and the third (32) end ridges are all oriented so as to define respective peaks extending in a first direction outwardly relative to the peripheral cross section (4); and
(vii) the first (22) end ridges, the second (23) end ridges, and the third (32) end ridges all, due to their orientation in the first direction, are configured to operatively engage the cylinder wall through a suitable thickness of an oil film between ridges (22, 23, 32) of the oil control ring and the cylinder wall.

5. Ring (1) according to claim 4, further comprising surface treatments and ceramic and metallic coatings, with the aim of improving the characteristics of resistance to wear, corrosion and decrease of the attrition forces.

\* \* \* \* \*